Dec. 7, 1965 H. ERICKSON 3,222,293
CATALYST DEMETALLIZATION
Filed Jan. 19, 1961 2 Sheets-Sheet 1

INVENTORS
HENRY ERICKSON
JAMES P. GALLAGHER
HOWARD G. RUSSELL

BY *Adams, Forward & McLean*

ATTORNEY

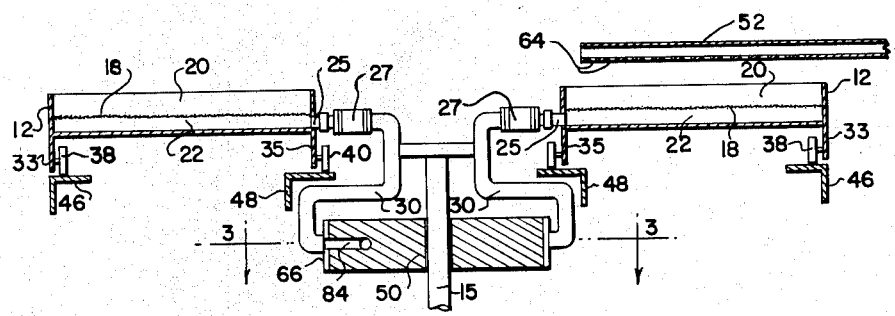
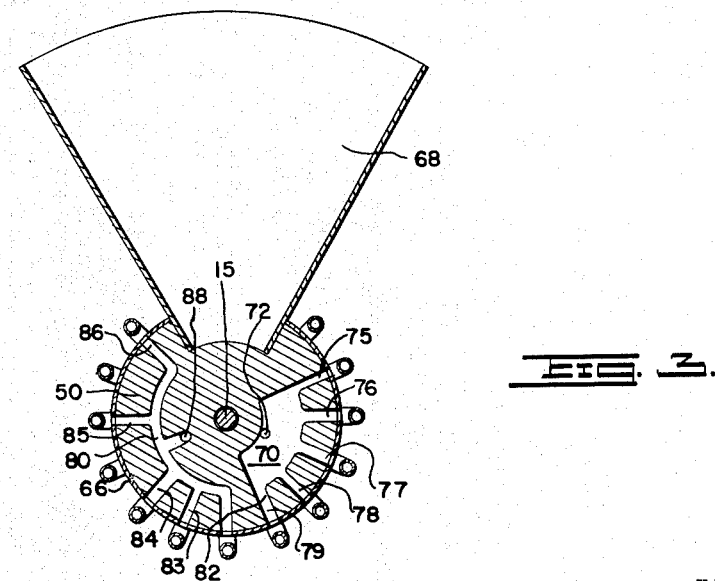

United States Patent Office 3,222,293
Patented Dec. 7, 1965

3,222,293
CATALYST DEMETALLIZATION
Henry Erickson and James P. Gallagher, Park Forest, Ill., and Howard G. Russell, Munster, Ind., assignors, by mesne assignments, to Sinclair Research, Inc., New York, N.Y., a corporation of Delaware
Filed Jan. 19, 1961, Ser. No. 83,746
The portion of the term of the patent subsequent to Sept. 1, 1981, has been disclaimed
5 Claims. (Cl. 252—413)

This invention is a method for treating a silica-based catalyst which has been contaminated with metal by use in the catalytic conversion of hydrocarbons containing the metal. This invention provides for a simplified mode of contacting the catalyst with an aqueous oxidizing medium, wash water and a dilute ammonium hydroxide solution. The invention may be used as part of an overall metals-removal procedure employing a plurality of processing steps to remove a significant amount of one or more of nickel, vanadium and iron, contained in the poisoned catalyst.

One of the most important phases of the study in the improvement of catalysts performance in hydrocarbon conversion is in the area of metals poisoning. Although referred to as "metals," these catalyst contaminants may be in the form of free metals or relatively non-volatile metal compounds. It is to be understood that the term "metal" used herein refers to either form. Various petroleum stocks have been known to contain at least traces of many metals. For example, Middle Eastern crudes contain relatively high amounts of several metal components, while Venezuelan crudes are noteworthy for their vanadium content and are relatively low in other contaminating metals such as nickel. The need has been expressed in the art for better utilization of petroleum residua or similar hydrocarbon feeds. The chief deterrent to catalytic cracking of such feeds by conventional means has been the severe catalyst contamination, due to contaminant metal in many petroleum stocks which leads to poor catalyst activity and often to poor product distribution and otherwise reduces the desired effectiveness of the catalyst. Because most of these metals, when present in a stock, deposit in a relatively non-volatile form on the catalyst during the conversion processes, and regeneration of the catalyst to remove coke does not remove these contaminants, such feeds are generally avoided. Nickel and vanadium for example, markedly alter the selectivity and activity of cracking reactions if allowed to accumulate, producing a higher yield of coke and hydrogen at the expense of desired products, such as gasoline and butanes.

A number of procedures have become available which provide for the removal of the common metal poisons iron, nickel and vanadium from a contaminated hydrocarbon conversion catalyst. Such procedures frequently involve contact of the catalyst at elevated temperatures with vapors reactive with the poisoning metal on the catalyst and are described, for example, in copending applications Serial No. 758,681, filed September 3, 1958, now abandoned; 763,833 and 763,834, filed September 29, 1958, both now abandoned; 767,794, filed October 17, 1958, now abandoned; 842,618, filed September 28, 1959, now abandoned; 849,199, filed October 28, 1959, now abandoned; 19,313, filed April 1, 1960, now abandoned; 39,810, filed June 30, 1960, now Patent No. 3,168,481; 47,598, filed August 4, 1960, now Patent No. 3,168,482; 53,380, filed September 1, 1960, now Patent No. 3,122,-497; 53,623, filed September 2, 1960, now abandoned; 54,368, 54,405 and 54,532, filed September 7, 1960, now Patents No. 3,122,512, 3,122,510 and abandoned, respectively; 55,703, filed September 13, 1960, now abandoned; 55,129, 55,160 and 55,184, filed September 12, 1960, now Patents No. 3,147,209, 3,150,103 and abandoned, respectively; 55,838, filed September 14, 1960, now abandoned; 67,518, filed November 7, 1960; and 73,199, filed December 2, 1960, now Patent No. 3,151,088; all of which are herein incorporated by reference.

It has been found that nickel and vanadium may be removed from a catalyst by certain aqueous media; a basic aqueous wash containing ammonium ions is suitable for removal of V poisons as reported in copending application Serial No. 39,810. The removal of nickel and perhaps some iron may be accomplished by the use of a slightly acid aqueous wash when the nickel is first converted into a compound dispersible in such a wash. A poisoned catalyst may be reduced in nickel content by an aqueous wash when nickel contaminants are put into a dispersible form by oxidizing a sulfided nickel-contaminated catalyst. Such an oxidation may be performed by an aqueous oxidizing agent, as explained in copending application Serial No. 842,618.

This invention provides an improved procedure by which contact of the catalyst with these aqueous media may be improved. The invention uses a modified pan filter for the contact procedures.

Pan filters are widely used in industry. In general the filter consists of several horizontal wedge-shaped pans which rotate around a central core through filling, filtering and dumping stages. A filter cake is formed on a cloth or screen near the bottom of these pans. Vacuum is applied to the underside of this filter cloth or screen to accelerate filtrate flow through the cake. After filtrate removal the pan proceeds to a dump position where a mechanism rotates the pan on a horizontal axis to turn the pan upside down for cake discharge. After discharge the pan is rotated back to its normal position ready to receive more slurry.

A conventional pan filter is modified to provide for the catalyst contact procedures of this invention. A provision is made for air blow-back through the filter cloth during about the first third or half of the cycle and deeper pans are provided to hold the volume of a 20 to 40% solids catalyst slurry.

Catalytically promoted methods for the chemical conversion of hydrocarbons include cracking, hydrocracking, reforming, hydroforming, etc. Such reactions generally are performed at elevated temperatures, for example, about 300 to 1200° F., more often 600 to 1000° F. Feedstocks to these processes comprise normally liquid and solid hydrocarbons which at the temperature of the conversion reaction are generally in the fluid, i.e. liquid or vapor state and the products of the conversion frequently are lower-boiling materials.

In particular, cracking of heavier hydrocarbon feedstocks to produce hydrocarbons of preferred octane rating boiling in the gasoline range is widely practiced and uses a variety of solid oxide catalysts to give end products of fairly uniform composition. Cracking is ordinarily effected to produce gasoline as the most valuable product and is generally conducted at temperatures of about 750 to 1100° F., preferably about 850 to 950° F., at pressures up to about 2000 p.s.i.g., preferably about atmospheric to 100 p.s.i.g., and without substantial addition of free hydrogen to the system. In cracking, the feedstock is usually a mineral oil or petroleum hydrocarbon fraction such as straight run or recycle gas oils or other normally liquid hydrocarbons boiling above the gasoline range.

Solid oxide catalysts have long been recognized as useful in catalytically promoting conversion of hydrocarbons. For cracking processes, the catalysts which have received the widest acceptance today are usually activated or calcined predominantly silica or silica-based, e.g. silica-alumina, silica-magnesia, silica-zirconia, etc., compositions in a state of slight hydration and containing small amounts of acidic oxide promoters in many instances. The oxide catalyst may be alumina- or silica-based and ordinarily contains a substantial amount of a gel or gelatinous precipitate comprising a major portion of silica and at least one other material, such as alumina, zirconia, etc. These oxides may also contain small amounts of other inorganic materials, but current practice in catalytic cracking leans more toward the exclusion from the silica hydrate materials of foreign constituents such as alkaline metal salts which may cause sintering of the catalyst surface on regeneration and a drop in catalytic activity. For this reason, the use of wholly or partially synthetic gel or gelatinous catalysts, which are more uniform and less damaged by high temperatures in treatment and regeneration, is often preferable. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The catalyst may be only partially of synthetic material; for example it may be made by the precipitation of silica-alumina on clay, such as kaolinite or halloysite. One such semi-synthetic catalyst contains about equal amounts of silica-alumina gel and clay.

The manufacture of synthetic gel catalysts can be performed, for instance (1) by impregnating silica with alumina salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by a combination of hydrated silica with other hydrate bases as, for instance, zirconia, etc. These synthetic gel-type catalysts are activated or calcined before use.

The physical form of the catalyst varies with the type of manipulative process to which it will be exposed. In a fixed-bed process, a series of catalytic reactors may be used, some being on stream and others in the process of cleaning, regeneration, etc. In circulating catalyst systems, such as those of the fluid catalytic and "TCC" processes, catalyst moves through a reaction zone and then through a regeneration zone. In the fluid process, gases are used to convey the catalyst and to keep it in the form of a dense turbulent bed which has no definite upper interface between the dense (solid) phase and the suspended (gaseous) phase mixture of catalyst and gas. This type of processing requires the catalyst to be in the form of a fine powder, generally in a size range of about 20 to 150 microns. In the "TCC" or "Thermofor" process the catalyst is in the form of beads which are conveyed by elevators. Generally these beads may range in size up to about ½" in diameter. When fresh, the minimum sized bead is generally about ⅛". Other types of processes use other forms of catalyst such as tablets or extruded pellets.

Feeds to a conversion system which uses this invention may comprise petroleum distillate fractions or residua, usually boiling above about 400° or even above about 600° F. The feed often may have an API gravity in the range of about 0° to 25°, a Conradson carbon content in the range of about 3 to 35 weight percent and a viscosity above about 75 or even 200 seconds Saybolt Furol at 210° F. These charge stocks, contain nickel, sometimes as much as 0.005%, and usually other metals notably vanadium as well. Feedstocks containing more than about 1.5 parts per million of vanadium and/or more than about 0.6 part per million of nickel are generally avoided in cracking processes and most refiners prefer less than about 0.5 part per million of vanadium or about 0.2 part per million of nickel in the cracking stock. Metal contents above these ranges may be present in feeds to a system which uses this invention; it will be apparent that oils having metal contents in these generally undesirable ranges are the oils which exploit this invention. A mixture of vanadium and nickel may be considered as harmful as a single metal even though the individual amounts of each metal are below the values mentioned above because the effect of the total amount of the metallic components is frequently sufficient to give harmful effects during catalytic cracking. In most cases, however, the total of one or both of these metals in the feed will be at least about 0.5 p.p.m. The maximum amount of metals in the feed can vary widely; most often the maximum amount of these poisoning metals in the stock will not exceed about 50 p.p.m. nickel and about 100 p.p.m. vanadium.

The feed to the cracking zone is vaporized and catalytically treated under more or less conventional fluid catalytic cracking conditions and often results in a conversion of about 30–80% of the feedstock into lower-boiling products. These conditions generally include a temperature of about 850° to 1000° F., preferably about 925 to 975° F. and a pressure between about 5 and 25 p.s.i.g., at a weight hourly space velocity from about 0.1 to 10. The products of the cracking are conducted to a fractionator, with or without intermediate cooling. In the fractionation, which may be conducted under partial vacuum, the lower boiling gasoline constituents of the cracker effluent having an approximate 375° to 430° F. end point are vaporized and removed from the system and may be used as gasoline blending components or other products. This invention is of particular utility in processes employing fluidized catalyst systems. The catalytic conversion system also includes a "regeneration" procedure in which the catalyst is contacted periodically with free oxygen-containing gas in order to restore or maintain the activity of the catalyst by removing carbon. Generally, a portion of the cracking catalyst is continuously or intermittently removed from the reactor to a regenerator and held, for example, in air, at a temperature and for a sufficient amount of time to substantially reduce the carbon content of the catalyst, and then returned to reactor. Regeneration of a catalyst to remove carbon is a relatively quick precedure in most commercial catalytic conversion operations. For example, in a typical fluidized cracking unit, a portion of catalyst is continually being removed from the reactor and sent to the regenerator for contact with air at about 950 to 1200° F., more usually about 1000 to 1150° F. Combustion of coke from the catalyst is rapid, and for reasons of economy only enough air is used to supply the needed oxygen. Average residence time for a portion of catalyst in the regenerator may be on the order of about six minutes and the oxygen content of the effluent gases from the regenerator is desirably less than about ½%.

Preferably, coke yield is held to a minimum through the use of good steam stripping and a high steam partial pressure in the reactor and the catalyst surface is kept reasonably free of metal poisons by demetallization. Ordinarily, the catalysts are treated before the poisoning metals have reached an undesirably high level, for instance, about 2%, generally no more than about 1% maximum, content of vanadium and/or nickel.

The catalyst may be removed from the cracking system—that is, the stream of catalyst which is cycled between conversion and regenerating operations—before the poison content reaches about 5000 to 10,000 p.p.m., the poisoning metals being calculated as their common oxides. Generally, at least about 250 or 500 p.p.m. vanadium and/or at least about 100 or 200 p.p.m. nickel will be accumulated on the catalyst before demetallization is warranted. A suitable amount, generally a small portion of the catalyst, is removed from the cracker and demetallized, preferably after the oxidation regeneration which serves to remove carbonaceous deposits. With a continuously circulating catalyst stream, such as in the ordinary "fluid" system a slip-stream of catalyst may conveniently be removed intermittently or continuously from the regenerator standpipe. The severity of regeneration is generally such that the catalyst sent to demetallization contains not more than about 0.5% carbon. The demetallization treatment may remove a substantial part of one or both nickel and vanadium. The aqueous treatment of this invention is employed subsequent to a procedure which includes sulfidation of the catalyst and also, preferably, a high-temperature treatment, preliminary to sulfidation, with molecular oxygen-containing gas. Immediately after removal of catalyst from the cracking system, subjecting the poisoned catalyst sample to magnetic flux may be found desirable to remove any tramp iron particles which may have become mixed with the catalyst. Sulfiding or any other given step in the demetallization treatment is usually continued for a time sufficient to effect a substantial conversion or removal of poisoning metal and ultimately results in a substantial increase in metals removal compared with that which would have been removed if the particular step had not been performed. The actual time or extent of treating depends on various factors and is controlled by the operator according to the situation he faces, e.g. the extent of metals content in the feed, the level of conversion unit tolerance for poison, the sensitivity of the particular catalyst toward a particular phase of the demetallization procedure, etc.

A preliminary treatment of the catalyst with molecular oxygen-containing gas is of value in improving the vanadium removed by subsequent procedures and also appears to have an effect on the material produced in sulfiding. This treatment is described in copending application Serial No. 19,313, filed April 1, 1960, and is preferably performed at a temperature at least about 50° F. higher than the regeneration temperature, that is, the average temperature at which the major portion of carbon is removed from the catalyst. The temperature of treatment with molecular oxygen-containing gas will generally be in the range of about 1050 to 1800° F. but below a temperature where the catalyst undergoes any substantial deleterious change in its physical or chemical characteristics, preferably a temperature of about 1150 to 1350° or even as high as 1600° F. The duration of the oxygen treatment and the amount of vanadium prepared by the treatment for subsequent removal is dependent upon the temperature and the characteristics of the equipment used. If any significant amount of carbon is present in the catalyst at the start of this high-temperature treatment, the essential oxygen contact is that continued after carbon removal, which may vary from the short time necessary to produce an observable effect in the later treatment, say, a quarter of an hour to a time just long enough not to damage the catalyst. In any event, after carbon removal, the oxygen treatment of the essentially carbon-free catalyst is at least long enough to stabilize a substantial amount of vanadium in its highest valence state, as evidenced by a significant increase, say at least about 10%, preferably at least about 100%, in the vanadium removal in subsequent stages of the process. This increase is over and above that which would have been obtained by the other metals removal steps without the oxygen treatment.

The duration of the oxygen treatment and the amount of vanadium prepared by the treatment for subsequent removal is dependent upon the temperature and the characterisics of the equipment used. The length of the oxygen treatment may vary from the short time necessary to produce an observable effect in the latter treatment, say, a quarter of an hour, to a time just long enough not to damage the catalyst. In a relatively static apparatus such as a muffle furnace, the effectiveness of the treatment can increase with time over a rather extended period; in other types of apparatus, however, such as a flow reactor, where there is more thorough contact of catalyst and gas, little increase in effectiveness was observed after about four hours of treatment.

The oxygen-containing gas used in the treatment contains molecular oxygen as the essential active ingredient. The gas may be oxygen, or a mixture of inert gas with oxygen, such as air or oxygen-enriched air. The partial pressure of oxygen in the treating gas may range widely, for example, from about 0.1 to 30 atmospheres, but usually the total gas pressure will not exceed and will be far below about 25 atmospheres. As the oxygen partial pressure increases the time needed to stabilize the valence of a given amount of vanadium in general decreases. The factors of time, partial pressure and extent of vanadium stabilization may be chosen with a view to the most economically feasible set of conditions. It is preferred to continue the oxygen treatment for at least about 15 or 30 minutes with a gas containing at least about 1%, preferably at least about 10% oxygen.

The sulfiding step can be performed by contacting the poisoned catalyst with elemental sulfur vapors, or more conveniently by contacting the poisoned catalyst with a volatile sulfide, such as $H_2S$, $CS_2$ or a mercaptan. The contact with the sulfur-containing vapor can be performed at an elevated temperature generally in the range of about 500 to 1500° F., preferably about 800 to 1300° F. Other treating conditions can include a sulfur-containing vapor partial pressure of about 0.1 to 30 atmospheres or more, preferably about 0.5 to 25 atmospheres. Hydrogen sulfide is the preferred sulfiding agent. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run for, say, up to about 20 hours or more depending on these conditions and the severity of the poisoning. Temperatures of about 900 to 1200° F. and pressures approximating 1 atmosphere or less seem near optimum for sulfiding, and this treatment often continues for at least 1 or 2 hours but the time of course can depend upon the manner of contacting the catalyst and sulfiding agent and the nature of the treating system, e.g. batch or continuous.

The sulfiding step provides the catalyst with sulfur-containing metal compounds and also appears to concentrate some metal poisons, especially nickel, at the surface of the catalyst particle. Poisoning metal sulfide is formed, but this sulfide may not necessarily be a simple sulfide of a single metal. Other poisoning metal-sulfur compounds also appear to be formed and some of these compounds may be removed from the catalyst during the sulfiding, particularly when the catalyst contains both nickel and vanadium. However, good catalyst performance in cracking requires that the metal poisons brought to the catalyst surface in sulfiding be removed by procedures subsequent to the sulfiding, that is, by the conversion, through use of an oxidation medium, of the poisoning metal to a dispersible form with subsequent removal of this form by an aqueous medium. Sulfidation has been found useful in removing some amount of each of the principal poisoning metals, nickel and vanadium from a siliceous base catalyst. Its effectiveness for removing nickel is increased at the upper portion of the temperature range.

In this invention metal poisons are provided in a dispersible form by contact of the sulfided catalyst, in a pan filter, with dilute nitric acid and air. The term "dispersible" is intended to include materials soluble in an aqueous medium, colloidal-size particles, and also minute particle size materal which can be carried away by the aqueous medium. The identity of all the soluble or otherwise dispersible forms produced in this invention has not been established. One form appears in particles about one micron in size, which particles may sometimes agglomerate. The filter is provided with cloth or screens which allow passage of these dispersible forms with the filtrate, while preventing the passage of catalyst. Fluidizable catalyst has a minimum size of about 20 microns, as mentioned above. Smaller particles than this (fines) are generally lost to the vapors employed in hydrocarbon conversion, regeneration and demetallization. The filter cloth or screen, therefore, should have openings of about 0.5 to 15 microns, preferably about 1 to 10 microns. Preferably, also, the filter pan is fabricated from stainless steel, which is chemically resistant to dilute nitric acid.

After sulfidation the catalyst is slurried with dilute nitric acid. This slurry is passed to the filter which is provided with air blow-back means to aerate the dilute nitric acid during rotation of the filter. Other oxygen-containing gases may be bubbled into the nitric acid slurry in place of air. The oxidation slurry generally contains more than about 20% solids and provides about five pounds of nitric acid per ton of catalyst, although up to ten pounds of nitric acid per ton of catalyst may be required when commercially treated water, which is somewhat basic, is employed in making up the nitric acid solution. The pH of the aerated nitric acid will generally be less than about 4.

The conditions of oxidation can be selected as desired. The temperature can conveniently range up to about 220° F. with temperatures of above about 150° F. being preferred. Contact with the hot catalyst may be sufficient to raise the temperature of the slurry from ambient temperature to around the boiling point. Temperatures above about 220° F. necessitate the use of superatmospheric pressures and no need for such has been found. The time required for oxidation is generally at least about 7 to 8 minutes, so that the pan filter is regulated for a cycle about two or three times as long as the oxidation time.

Vanadium is removed from the catalyst by washing it with a basic aqueous solution as described in copending application Serial No. 39,810. The pH is frequently greater than about 7.5 and the solution preferably contains ammonium ions which may be $NH_4+$ ions or organic-substituted $NH_4+$ ions such as methyl ammonium and quaternary hydrocarbon radical ammoniums. An aqueous solution of ammonium hydroxide is preferred. The preferred solutions have a pH of about 8 to 11. The amount of ammonium ion in the solution is sufficient to give the desired vanadium removal and will often be in the range of about 1 to 25 or more pounds per ton of catalyst treated. Five to fifteen pounds is the preferred ammonium range but the use of more than about 10 pounds does not appear to increase vanadium removal unless it increases pH. Between the acidic aqueous oxidizing treatment and the basic wash the catalyst is flushed with water for better reagent utilization and to remove further amounts of dispersible material from the catalyst. This aqueous medium, for best removal of nickel and to prevent hydrolysis and consequent precipitation of iron compounds on the catalyst, generally should be slightly acidified with a mineral acid such as nitric or hydrochloric acid. Ambient temperatures can be used in this wash but temperatures of about 150° F. to the boiling point of water and agitation are helpful in increasing the amount of metal removed.

After demetallization, the catalyst is conducted back to the cracking system, for instance, to the hydrocarbon conversion reactor or catalyst regenerator, although it may be desirable first to dry the catalyst filter cake or filter cake slurry at say about 250 to 450° F. and also, prior to reusing the catalyst in the conversion operation it can be calcined, say at temperatures usually in the range of about 700 to 1100° F. A fluidized solids technique is recommended for the sulfiding and other vapor contact processes uses in any selected demetallization procedure as a way to shorten the time requirements. After the available catalytically active poisoning metal has been removed, in any removal procedure, further reaction time may have relatively little effect on the catalytic activity of the depoisoned catalyst, although further metals content may be removed by repeated or other treatments or by increasing the demetallization rate, that is, the fraction of catalyst inventory sent to demetallization per unit time. Inert gases frequently may be employed after contact with reactive vapors to remove any of these vapors entrained in the catalyst or to purge the catalyst of reaction products. The amount of Ni, V or Fe removed in practicing the procedures outlined or the proportions of each which are removed may be varied by proper choice of treating conditions. It may prove necessary, in the case of very severely poisoned catalysts, to repeat the treatment to reduce the metals to an acceptable level, perhaps with variations where one metal is greatly in excess. A further significant advantage of these demetallization techniques lies in the fact that the overall metals removal operation, even if repeated, usually does not unduly deleteriously affect the activity, selectivity, pore structure and other desirable characteristics of the catalyst.

The present invention will be better understood by reference to the accompanying drawing in which FIGURE 1 represents a horizontal elevation of a pan-type filter which may be used in practicing this invention;

FIG. 2 is a vertical cross sectiona long the line 2—2 of FIG. 1; and

FIGURE 3 is a horizontal cross section along the line 3—3 of FIGURE 2.

Figure 1:
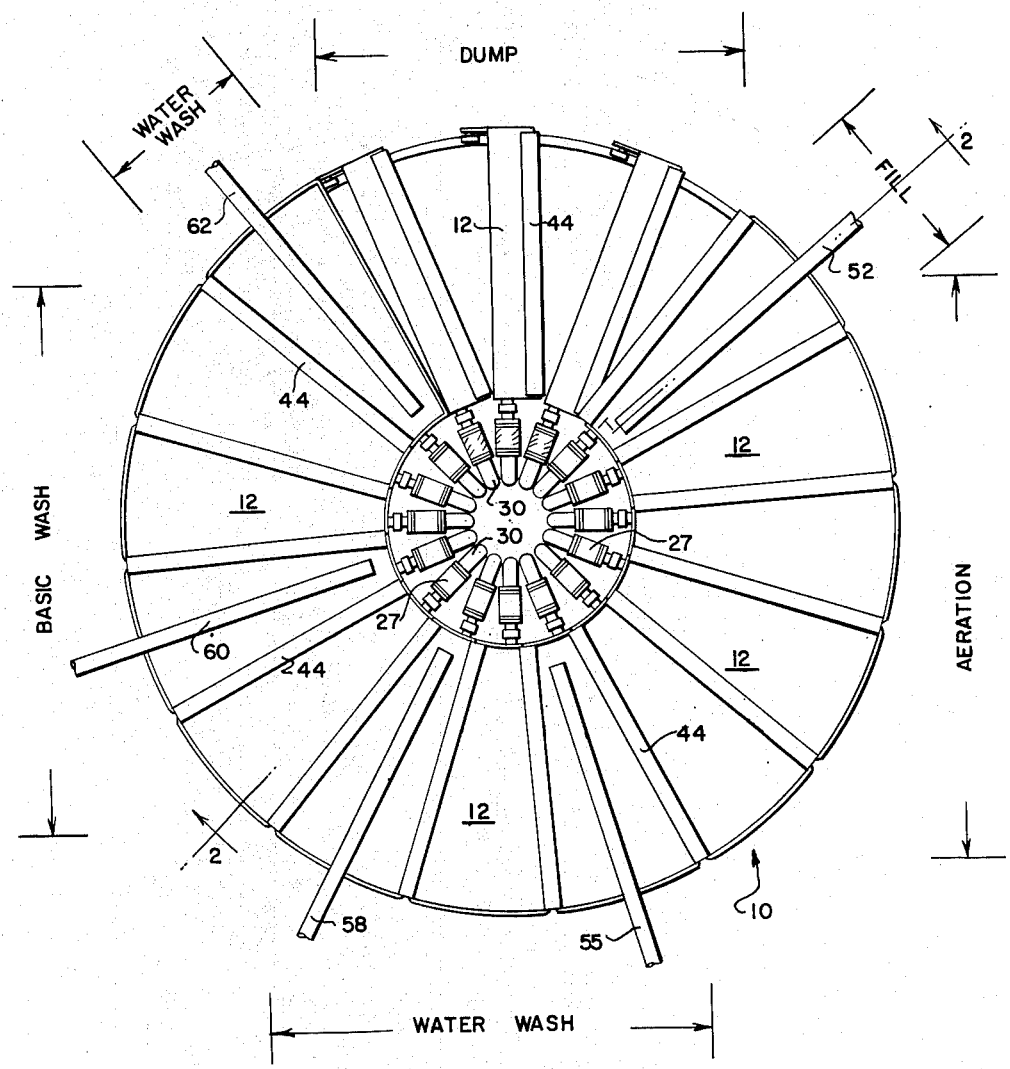

As shown, the filter 10 consists of a plurality of pans 12 each of which is generally wedge-shaped and fit together more or less to cover the area of a circle. The pans are arranged annually around the supporting axial rod 15 which leads to a motor, not shown. Each pan is provided with the fine mesh filter screen or cloth 18 which divides the pan into the prefilt chamber 20 and the drain chamber 22. As shown, the drain chamber 22 is continued as the drain line 25 which is connected by elastomer tube 27 to the exhaust line 30. Additional support may be given to the pan by struts 33 and 35 and wheels 38 and 40. All of the above-mentioned members rotate in unison. Each pan may also be provided with the lip 44 to cover the opening between individual pans. Stationary elements in the pan filter arrangement include the rails 46 and 48 and connecting member 50 for the exhaust lines 30. Also stationary are the feed lines 52, 55, 58, 60 and 62. Each of these lines is provided on its lower side with the perforations or slots 64.

The connecting member 50 may be, in its simplest form, a single casing, having passages for the flow of various fluids and provided with sealing surface 66. The collection trough or chute 68 is provided for the treated catalyst. The air manifold 70 conducts air from the source 72 to the air channels 75, 76, 77, 78 and 79. The drain conduit 80 conducts fluid from the channels 82, 83, 84, 85 and 86 to the vacuum source 88.

As shown in FIGURES 1 and 3, the zones through which a filter pan moves are delineated as the filling zone, where the pan is under the line 52, the aeration zone where the pan is adjacent the air manifold 70, the water wash zones where the pan is under the lines 55, 58 and 62 and adjacent the channels 83, 84 and 86, the basic wash zone where the pan is under the line 60 or adjacent the channel 85 and the dump zone where the pan is over the trough 68.

The operation of the device in performing the process of this invention will be obvious from the drawing and the description above. A slurry, containing perhaps 30–40% solids, of hot sulfided catalyst in dilute aqueous nitric acid flows onto the filter continuously from the line 52. With the motor rotating the pan assembly, the pan containing the slurry passes adjacent the channels 75, 76, 77, 78 and 79 in which zone air is passed into the slurry, agitating it and converting the catalyst poisons to a form dispersible in the aqueous medium. Heat may be applied by a radiant source, not shown, or by the addition of steam to the aeration air to hold the slurry temperature near boiling. Liquid is drained from the pan by the application of vacuum when the pan is adjacent channel 82. The filter cake is reslurried in acidified water in passing under line 55 and the pan is once more drained when adjacent channel 83. Reslurrying may be performed once more when the pan passes under line 58 and adjacent channel 84. When passing under line 60 the pan is sprayed with ammonia water from the line. This solution is held in the pan by sealing surface 66 until the pan is adjacent channel 85 where the liquid is once more withdrawn from the pan through the screen or cloth 18. Another wash and drain may be performed when the pan passes under line 62 and adjacent channel 86. In the dump zone the filter pan is allowed to rotate to discharge the catalyst filter cake. Such rotation may be allowed perhaps by discontinuity in the rails 46 and 48 in the dump zone and by the flexibility of the elastomer tubes 27. Also means, not shown, may be provided in the dump zone for water or air blow-back to aid in discharging the cake. The catalyst may be collected from the trough 68 by suitable means not shown, perhaps by a doctor blade, for passage back to the hydrocarbon conversion system.

*Example*

A vacuum residuum derived from a West Texas crude oil had an API gravity of 15.1, a Conradson carbon content of about 8.8 weight percent, a viscosity of about 400 seconds Saybolt at 210° F., and an initial boiling point above about 1000° F. and contains 24.7 p.p.m. of nickel, 39.9 p.p.m. of vanadium and 21.3 p.p.m. of iron. A steam residuum mixture having a 1 to 1 volume ratio is mixed with a cracking catalyst having a particle size range of about 20 to 150 microns. The cracking catalyst comprises a synthetic gel silica-alumina containing about 13% alumina. The total linear superficial gas velocity in the fluidized bed is about 1 to 2 ft./sec. The feed is introduced into the reactor as a gas containing entrained liquid hydrocarbons and solid catalyst, where it is heated to about 850° F. at a pressure of about 8 p.s.i.g. and a WHSV of about 5. Under these conditions, a 30–40% conversion of the feed to lighter materials is effected with the effluent hydrocarbon being substantially free of the metal contaminants along with the associated coke formers. Catalyst is taken from the reactor and its carbon content is reduced from about 2 to 0.5 weight percent through contact with air in the regenerator.

A slip stream of regenerated catalyst analyzing 0.5% coke, 460 p.p.m. nickel, 1600 p.p.m. vanadium and 1040 p.p.m. iron is continuously withdrawn from the regenerator at a daily inventory rate of 60% and sent to demetallization where it is held for about 2 hours in a zone where it is contacted with air at about 1300° F. and then sent to a sulfiding zone where it is fluidized with $H_2S$ gas at a temperature of about 1050° F. for about 2 hours. Sulfided catalyst is slurried with a dilute (about 0.1%) solution of nitric acid in water and the 25% solids slurry is sent to a pan filter having 16 pans which has been modified to provide for aeration of six pans and to provide about 25 minutes for a complete rotation. The aeration zone is also provided with heat lamps to keep the slurry in the pans in this zone at the slurry temperature of about 200° F. The pan containing the slurry travels past the aeration zone to a drain portion where vacuum is applied to remove the liquid from the pan. As the rotation continues, the pan is filled with water acidified with nitric acid to a pH of about 4. This liquid is subsequently drained and the pan is refilled with an ammonium hydroxide solution having a pH of about 8 to 11. This liquid is removed from the pan just before the pan reaches the dump zone. Catalyst is collected from the dump zone, dried, calcined and returned to the regenerator. The metals level of the cracking catalyst after demetallization analyzes 185 p.p.m. nickel, 1170 p.p.m. vanadium and 810 p.p.m. iron.

It will thus be readily seen that this invention provides for continuous catalyst treatment in an apparatus of more or less conventional design.

What is claimed is:
1. In the method for treating a silica-based catalyst which has been contaminated with metal selected from the group consisting of nickel and vanadium by use in the catalytic conversion of hydrocarbons containing said metal in an amount sufficient to cause deterioration in said catalyst, the steps which comprise sulfiding the contaminating metal component of the catalyst by contact with sulfiding vapors at an elevated temperature of about 500 to 1500° F., contacting the catalyst with dilute aqueous nitric acid, feeding the resulting aqueous slurry to a rotating pan filter, passing the pan through a series of zones where, in the first zone oxygen-containing aeration gas is passed into the slurry in the pan, in a succeeding zone liquid is drained from the pan, in a further succeeding zone water is passed to the pan to wash the catalyst and the wash water is drained, in a further succeeding zone dilute aqueous ammonia solution is passed to the pan and aqueous ammonia solution is drained from the pan and removing catalyst filter cake from the pan and returning said catalyst to the hydrocarbon conversion system.

2. The method of claim 1 in which the water is acidified.

3. A method for the removal from a synthetic gel, silica-based hydrocarbon cracking catalyst of metal contaminant selected from the group consisting of nickel and vanadium deposited on the catalyst by use in the catalytic cracking to gasoline of hydrocarbons containing at least 0.5 p.p.m. of said contaminant, the steps which comprise removing the catalyst containing at least about 250 p.p.m. vanadium and at least about 100 p.p.m. nickel from the hydrocarbon cracking system, sulfiding the contaminating metal component of the catalyst by contact with a sulfiding vapor at a temperature of about 500 to 1500° F., slurrying the sulfided catalyst with dilute aqueous nitric acid, feeding said slurry to a rotating pan filter, passing the pan through a series of zone where, in the first zone oxygen-containing aeration gas is passed into the slurry in the pan, in a succeeding zone liquid is drained from the pan, in a further succeeding zone water is passed to the pan to wash the catalyst and the wash water is drained, in a further succeeding zone dilute aqueous ammonia solution is passed to the pan and aqueous ammonia solution is drained from the pan and removing catalyst filter cake from the pan and returning said catalyst of decreased metal content to the hydrocarbon cracking system.

4. The method of claim 3 wherein the slurry is contacted with an oxygen-containing aeration gas at a temperature of about 150–220° F.

5. A method for the removal from a synthetic gel, silica-based hydrocarbon cracking catalyst of metal contaminant selected from the group consisting of nickel and vanadium, deposited on the catalyst by use in the catalytic cracking to gasoline of hydrocarbons containing at least 0.5 p.p.m. of said contaminant, the steps which comprise passing catalyst from the cracking zone to a regeneration zone wherein carbon is burned from the catalyst, passing regenerated catalyst to the cracking zone, removing from the cracking-regeneration system the catalyst containing at least about 250 p.p.m. vanadium and at least about 100 p.p.m. nickel, contacting the withdrawn, essentially carbon-free catalyst with a gas containing molecular oxygen at a temperature of about 1050 to 1800° F. to enhance subsequent vanadium removal, sulfiding the contaminating metal component of the catalyst by contact with a sulfiding vapor at about 500 to 1500° F. to enhance subsequent nickel removal, slurrying the sulfided catalyst with dilute aqueous nitric acid, feeding said slurry to a rotating pan filter, passing the pan through a series of zones where, in the first zone oxygen-containing aeration gas is passed into the slurry in the pan at about 150 to 220° F., in a further succeeding zone water is passed to the pan to wash the catalyst and the wash water is drained, in a further succeeding zone dilute aqueous ammonia solution is passed to the pan and aqueous ammonia solution is drained from the pan and returning catalyst of decreased metal content ot the hydrocarbon cracking system.

References Cited by the Examiner

UNITED STATES PATENTS

| | | | |
|---|---|---|---|
| 2,494,556 | 1/1950 | Hornaday | 252—413 X |
| 2,754,273 | 7/1956 | Shabaker | 252—413 X |
| 3,147,228 | 9/1964 | Erickson | 252—412 |

FOREIGN PATENTS

| | | |
|---|---|---|
| 596,177 | 4/1960 | Canada. |
| 1,040,723 | 10/1958 | Germany. |

MAURICE A. BRINDISI, *Primary Examiner.*

JULIUS GREENWALD, *Examiner.*